(12) United States Patent
Rauschning

(10) Patent No.: US 6,167,801 B1
(45) Date of Patent: Jan. 2, 2001

(54) PEELER FOR ROOT VEGETABLES

(75) Inventor: Kenneth Rauschning, Nyvång (SE)

(73) Assignee: Rauschnings Maskin Tekniska AB, Nyvång (SE)

( * ) Notice: Under 35 U.S.C. 154(b), the term of this patent shall be extended for 0 days.

(21) Appl. No.: 09/458,096

(22) Filed: Dec. 10, 1999

Related U.S. Application Data

(63) Continuation of application No. PCT/SE98/01110, filed on Jun. 10, 1998.

(30) Foreign Application Priority Data

Jun. 12, 1997 (SE) .................................................. 9702253

(51) Int. Cl.[7] .............................. A23N 7/00; A23N 7/02; A23N 15/08; A47J 17/18
(52) U.S. Cl. ................................ 99/631; 99/540; 99/593; 99/623; 99/629
(58) Field of Search ............................. 99/539–541, 516, 99/525, 629–633; 426/481–483

(56) References Cited

U.S. PATENT DOCUMENTS

| | | | |
|---|---|---|---|
| 3,001,561 | * 9/1961 | Vam Raay | 99/591 |
| 3,122,188 | * 2/1964 | Curtis | 99/492 |
| 4,143,593 | 3/1979 | van Raay . | |
| 4,335,650 | 6/1982 | Prevot . | |

FOREIGN PATENT DOCUMENTS

| | | |
|---|---|---|
| 448406 | 3/1968 | (CH) . |
| 494542 | 9/1970 | (CH) . |
| 1086021 | 7/1960 | (DE) . |
| 1914182 | 10/1970 | (DE) . |
| 71449 | 9/1950 | (DK) . |
| 117096 | 3/1970 | (DK) . |
| 242663 | 4/1926 | (GB) . |
| 2037147 | 7/1980 | (GB) . |
| 2295532 | 6/1996 | (GB) . |
| 110078 | 12/1964 | (NL) . |
| 301781 | 10/1965 | (NL) . |
| 6507198 | 12/1966 | (NL) . |
| 7106357 | 11/1972 | (NL) . |

* cited by examiner

*Primary Examiner*—Timothy F. Simone
(74) *Attorney, Agent, or Firm*—Burns, Doane, Swecker & Mathis, LLP

(57) ABSTRACT

The present invention relates to a device for peeling root vegetables. The device comprises a container (1), which at its bottom has at least two rotatably arranged discs (4), which have grating or cutting means on their upper side. According to the invention, the container (1) has a cylindrical outer wall (2), and the bottom of the container (1) is a rotatably arranged disc (3).

12 Claims, 2 Drawing Sheets

PEELER FOR ROOT VEGETABLES

This is a continuation of International Application No. PCT/SE98/01110, filed Jun. 10, 1998, that designates the United States of America and which claims priority from Swedish Application No. 9702253-7, filed Jun. 12, 1997.

TECHNICAL FIELD

The present invention relates to a device for peeling root vegetables. More specifically, the present invention relates to a device comprising a container, which at its bottom has at least two rotatably arranged discs, which have grating or cutting means arranged on their upper side.

BACKGROUND OF THE INVENTION

Today, there are many different devices for peeling root vegetables. In the conventional friction-peeling devices, the root vegetable is flung around in a rotating, cylindrical container, which is provided with a surface of Carborundum. These devices often produce a peeled root vegetable having reduced keeping qualities since the root vegetable, on the one hand, is exposed to heavy knocks when flung around and colliding with other root vegetables and the walls of the container and, on the other, gets a rough surface.

Furthermore, there are a number of knife-peeling devices, which produce a root vegetable that is better peeled, in so far as the surface has sharp cuts. However, in most knife-peeling devices, the problem of the root vegetables being exposed to knocks remains.

In DK 117,096, an apparatus for peeling fruit is disclosed. The apparatus comprises a container having at its bottom at least two discs mounted in bearings in a rotatable manner, which discs have grating or cutting means arranged on the upper side. The surface between the different discs is not moving in order to provide a brake surface, which makes the fruits turn when they slip off the rotating discs and into the stationary area. In order to be able to slow down the fruits to such an extent that they are rotated and turned in the stationary area, the discs must rotate at a relatively high speed, which makes the fruits bump into each other at a relatively high speed, which in turn results in a fruit with inferior keeping qualities.

In CH 494 542, a peeling machine is described, which comprises a container with a peeling disc rotatably arranged at its bottom. The peeling machine has recesses distributed over the inner surfaces of the container. This peeling machine also has the above-mentioned disadvantages.

SUMMARY OF THE INVENTION

One object of the present invention is to provide a device which does not have the above-mentioned disadvantages.

Another object is to provide a device which is reliable and achieves good peeling results.

Other objects, features and advantages of the present invention will be apparent from the description below.

In summary, the present invention relates to a device for peeling root vegetables. The device comprises a container, which at its bottom has at least two rotatably arranged discs, which have grating or cutting means on their upper side. According to the invention, the container has a cylindrical outer wall, and the bottom of the container is a rotatably arranged disc.

In a preferred embodiment, the rotatably arranged discs are arranged substantially flush with the rotating bottom disc. Thus, holes are made in the bottom disc, which are filled with the rotatably arranged discs.

In another preferred embodiment, a stirring means is arranged in the container to rotate in a direction opposite to the direction of rotation of the bottom disc.

The advantage of the present invention is that the root vegetables are carefully peeled evenly over the entire surface, and that the dimensions of the device can be selected within a wide range.

BRIEF DESCRIPTION OF THE DRAWINGS

In the following, preferred embodiments will be described with reference to the accompanying drawings. They are not to be considered to limit the scope of the present invention.

DETAILED DESCRIPTION OF THE INVENTION

Figure 1:
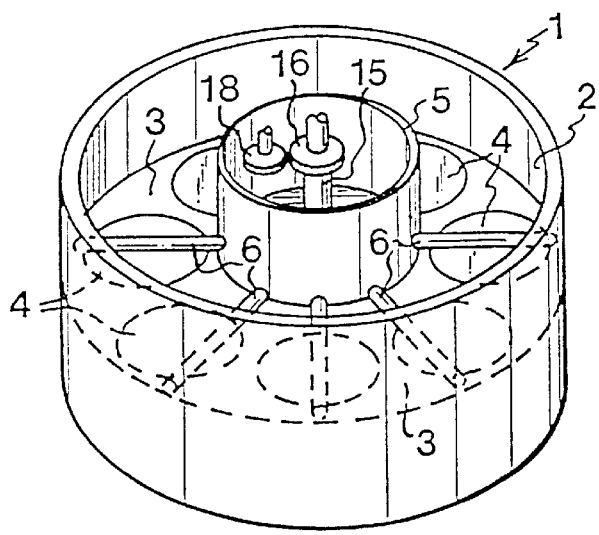
FIG. 1 is a perspective view of a preferred embodiment of the present invention.
Figure 2:
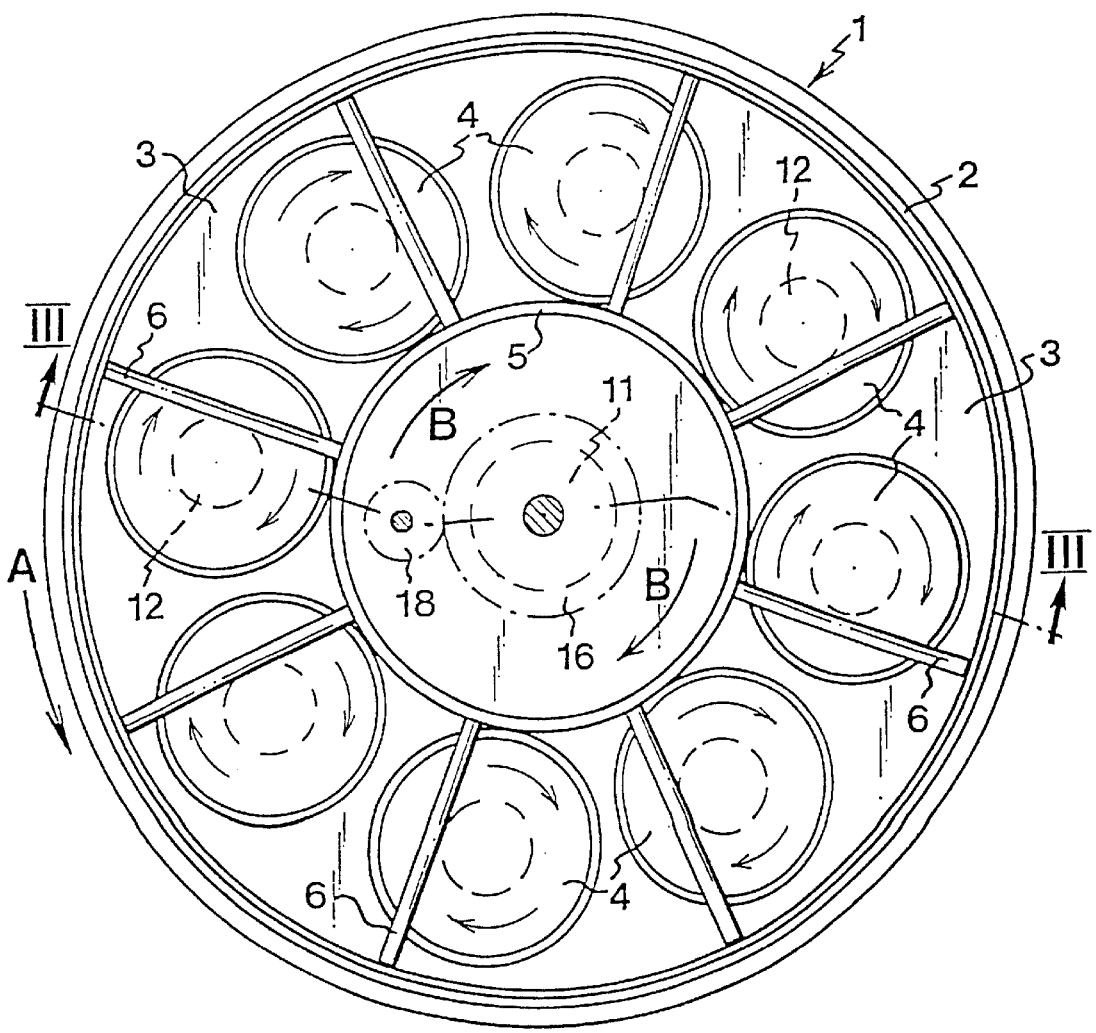
FIG. 2 is a plan view of the embodiment shown in FIG. 1.
Figure 3:
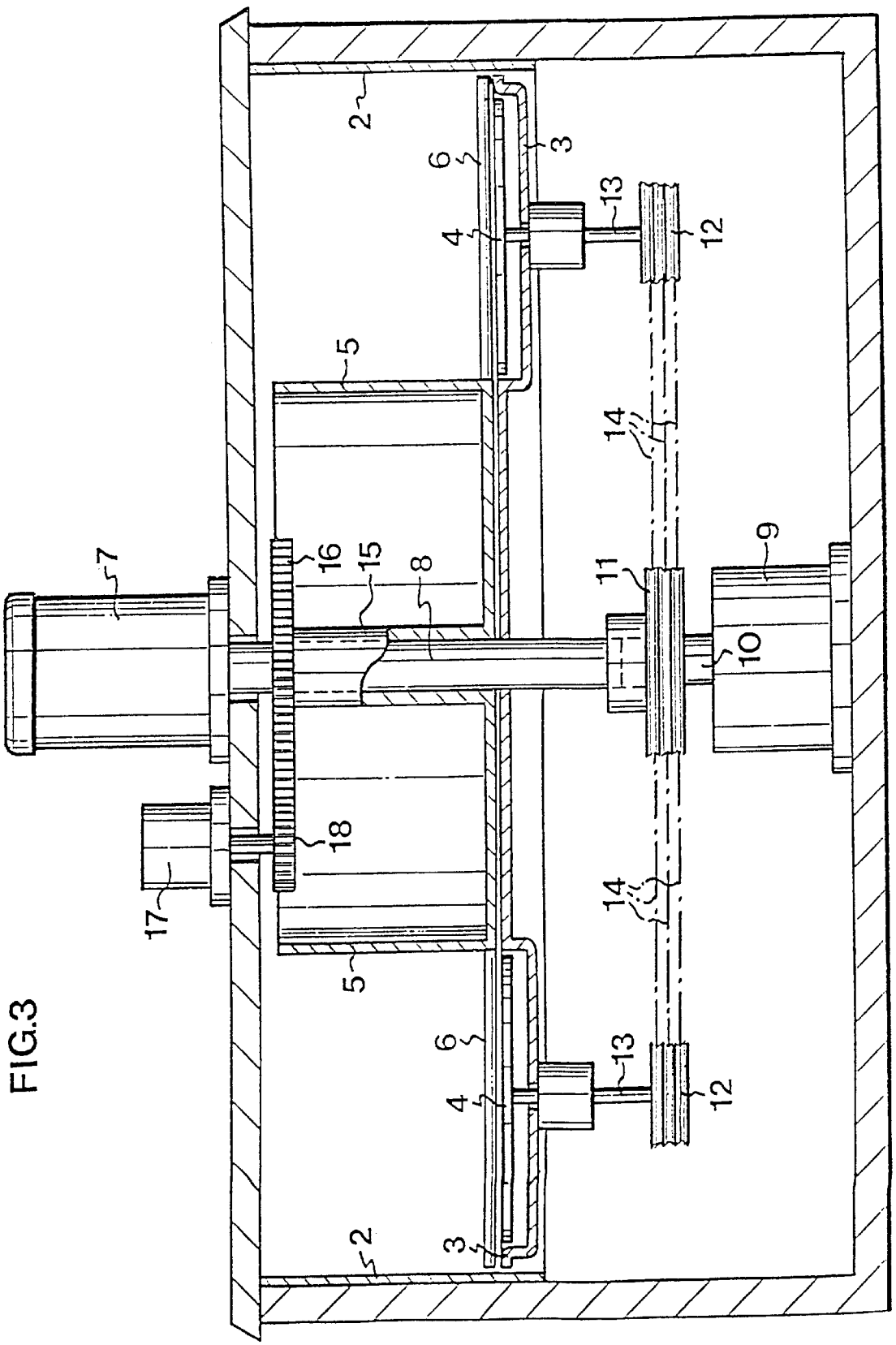
FIG. 3 is a sectional view along the line III—III in FIG. 2. In this figure, drive means for the device are illustrated.

The embodiment of the present invention, shown in FIGS. 1–3, comprises a container 1 having a cylindrical outer wall 2. The bottom of the container 1 is formed as a rotatable bottom disc 3, which in this embodiment rotates in the direction of the arrow "A". On this bottom disc 3, there are rotatably arranged peeling discs 4, on the surface of which grating means are arranged in the form of Carborundum. Naturally, there can also be other types of grating means and also different cutting means in the form of knives or the like. The peeling discs rotate according to the arrows shown in this embodiment.

Further, the embodiment shown in FIGS. 1–3 has a cylindrical inner wall 5. Stirring means 6 in the form of radially extended bars are fixedly connected to the cylindrical inner wall 5. In addition, the cylindrical inner wall 5 is rotatably arranged, the stirring means 6 when operating moving in a direction opposite to the direction of rotation of the bottom disc 3, as shown by the arrow "B". The stirring means 6 itself can, in another embodiment, be rotatably arranged, in which case the inner wall 5 is fixedly arranged.

In the embodiment shown in FIGS. 1–3, only the rotatably arranged peeling discs 4 in the bottom disc 3 are provided with grating means in the form of Carborundum. In other embodiments, also the bottom disc 3 and/or the inside of the outer wall 2 can be provided with crating or cutting means.

Further, as apparent from FIG. 3, the device has drive means for the movable parts of the device.

The rotation of the bottom disc 3 is achieved with the aid of a drive means 7 acting on an upper shaft portion 8 of a divided centre shaft, the bottom disc 3 being fixedly arranged in the upper shaft portion 8. The rotation of the peeling discs 4 is achieved with the aid of a drive means 9 acting on a lower shaft portion 10 of the divided centre shaft. On this lower shaft portion, pulleys 11 are arranged, which are interconnected by means of belts 14 with pulleys 12, which are arranged on shafts 13 under the peeling discs 4.

In this embodiment, the cylindrical inner wall 5 is fixedly connected to the stirring means 6 and to a hollow shaft 15, which receives the upper shaft portion 8 of the centre shaft. The shaft 15 has a gear wheel 16 driven by a drive means 17 via an additional gear wheel 18.

What is claimed is:

1. A device for peeling root vegetables comprising a container having a cylindrical outer wall;

a rotatable disc defining a bottom surface of the container; and at least two rotatable peeling discs disposed in the bottom of the container, said at least two rotatable discs including grating or cutting means;

wherein the at least two rotatable peeling discs are arranged substantially flush with the rotatable bottom disc.

2. A device according to claim 1, wherein the container has a cylindrical inner wall.

3. A device according to claim 1, further comprising a stirring means situated in the container and arranged to rotate in a direction opposite to a direction of rotation of the bottom disc.

4. A device according to claim 3, wherein the container has a cylindrical inner wall.

5. A device according to claim 3, wherein the stirring means comprises at least one radially extended bar.

6. A device according to claim 1, wherein the outer wall is provided with grating or cutting means.

7. A device according to claim 1, wherein the bottom disc is provided with grating or cutting means.

8. A device according to claim 4, wherein the inner wall is rotatably arranged, and the stirring means is fixedly connected to the inner wall.

9. A device according to claim 4, wherein the stirring means comprises at least one radially extended bar.

10. A device according to claim 3, wherein the outer wall is provided with grating or cutting means.

11. A device according to claim 3, wherein the bottom disc is provided with grating or cutting means.

12. A device according to claim 9, wherein the inner wall is rotatably arranged, and the stirring means is fixedly connected to the inner wall.

* * * * *